(12) United States Patent
Wikander

(10) Patent No.: US 8,842,969 B2
(45) Date of Patent: Sep. 23, 2014

(54) HAPTIC PLAYBACK OF VIDEO

(71) Applicant: Jered Wikander, Portland, OR (US)

(72) Inventor: Jered Wikander, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/630,130

(22) Filed: Sep. 28, 2012

(65) Prior Publication Data
US 2014/0093221 A1    Apr. 3, 2014

(51) Int. Cl.
*H04N 9/80* (2006.01)

(52) U.S. Cl.
USPC .......................................... 386/248

(58) Field of Classification Search
CPC ............ H04N 5/00; H04N 7/00; G06F 3/016; G06F 3/0017; G06F 3/0346
USPC ................... 386/200, 241, 248; 349/14.2, 515
See application file for complete search history.

(56) References Cited

U.S. PATENT DOCUMENTS

2010/0013761 A1 * 1/2010 Birnbaum et al. ............ 345/156
2010/0191459 A1 * 7/2010 Carter et al. ................... 701/208

* cited by examiner

*Primary Examiner* — Huy T Nguyen
(74) *Attorney, Agent, or Firm* — Caven & Aghevli LLC (57) ABSTRACT

An electronic device comprises an accelerometer, a video capture device, and logic to capture accelerometer data from the accelerometer and video content during an event, associate the accelerometer data with the video content in a time dimension, and store the accelerometer data and the video content in a storage medium. Other embodiments may be described.

19 Claims, 5 Drawing Sheets

HAPTIC PLAYBACK OF VIDEO

RELATED APPLICATIONS

None.

BACKGROUND

The subject matter described, herein relates generally to the field of electronic devices and more particularly to a system and method to implement haptic playback of forces captured in connection with video on one or more electronic devices.

Some electronic devices such as computers, laptop computers, tablet computers, personal digital assistants, mobile phones, and the like include one or more haptic feedback devices to provide haptic feedback to a user to enhance a user experience of an application. Such haptic feedback devices may include vibration assemblies, adjustable display features such as brightness, contrast, and the like.

Further, advances in portable devices such as video recording devices have created opportunities for people to record activities such as mountain biking, skiing, parasailing, and the like, in which the user experiences environmental forces. Accordingly techniques to provide haptic playback of video may find utility.

BRIEF DESCRIPTION OF THE DRAWINGS

The detailed description is described with reference to the accompanying figures.

DETAILED DESCRIPTION

Described herein are exemplary systems and methods to implement haptic feedback in electronic devices. In the following description, numerous specific details are set forth to provide a thorough understanding of various embodiments. However, it will he understood by those skilled in the art that the various embodiments may be practiced without the specific details. In other instances, well-known methods, procedures, components, and circuits have not been illustrated or described in detail so as not to obscure the particular embodiments.

Figure 1:
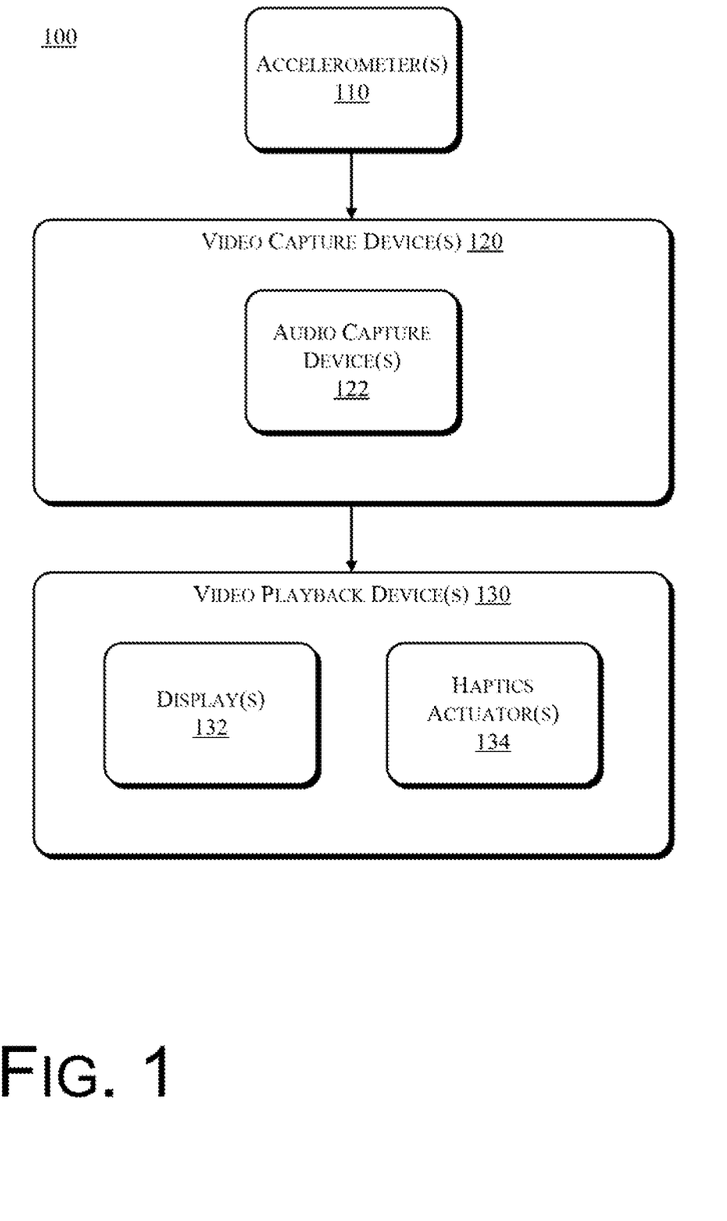
FIG. 1 is a schematic illustration of a system for haptic playback of video content.

FIG. 1 is a schematic illustration of a system for haptic playback of video content. Referring to FIG. 1, in some embodiments the system 100 comprises at least one accelerometer 110, at least one video capture device 120, and at least one video playback device 130.

In some embodiments the one or more accelerometers 110 may be embodied as piezoelectric, piezoresistive, and/or capacitive components which measure the acceleration to which the device is being subjected. In other embodiments the accelerometer may be embodied as an inertial measurement unit (IMU) capable of measuring the velocity, orientation, and acceleration to which the device is being subjected.

In some embodiments the video capture device(s) 120 may be embodied as a video camera or an image capture device such as a charge coupled device (CCD). Video capture device(s) 120 may be an analog device or a digital device and may comprise one or more audio capture devices 122 associated therewith to capture audio inputs.

In some embodiments the video playback device 130 may be embodied as an electronic device capable of video playback and may comprise, or be coupled to, one or more displays 132 and one or more haptics actuators 134.

In some embodiments the accelerometers(s) 110 may be embodied as a electronic device which is separate from the video capture device 120. By way of example, in some embodiments the accelerometer(s) 110 may be adapted to be worn on the body of a user, e.g., in an armband or a chest strap or the like, while the video capture device 120 may be embodied as a separate device, e.g. a camera mountable on a helmet, a bicycle, a watch or other apparatus. In other embodiments the accelerometer(s) 120 may be integrated with the video capture device(s) 120.

In further embodiments the entire system 100 may be a single integrated electronic device. In some embodiments the electronic device may be a special purpose electronic device constructed specifically for capture and display of video content. In other embodiments the system 100 may be implemented in a general purpose handheld computing device. By way of example, many smart phones and tablet computing devices incorporate one or more accelerometer(s) 110, video capture device(s) 120, and video playback device(s) 130.

Figure 2:
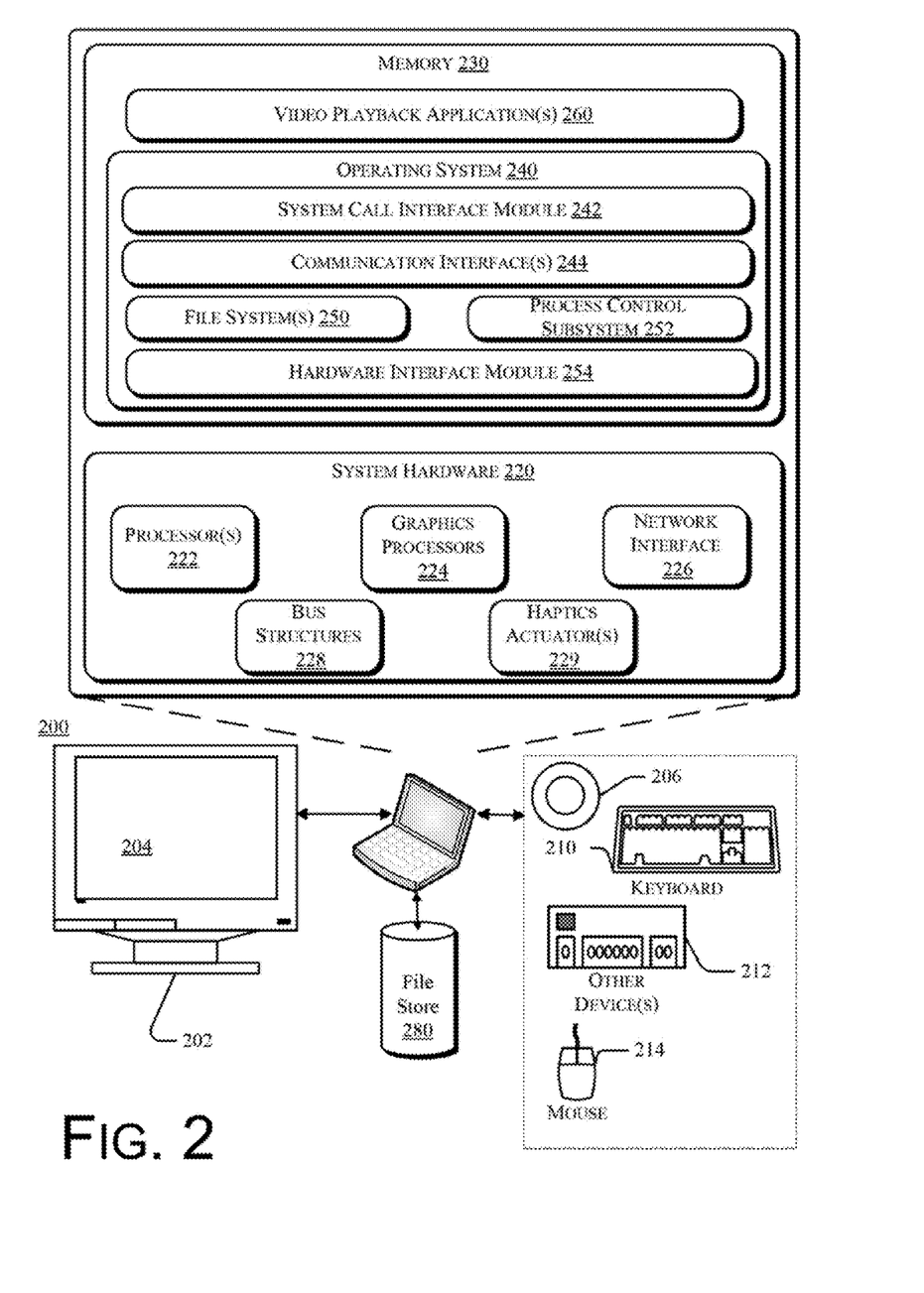
FIGS. 2-3 are schematic illustrations of exemplary electronic devices which may be adapted to implement haptic playback of video in accordance with some embodiments.
Figure 3:
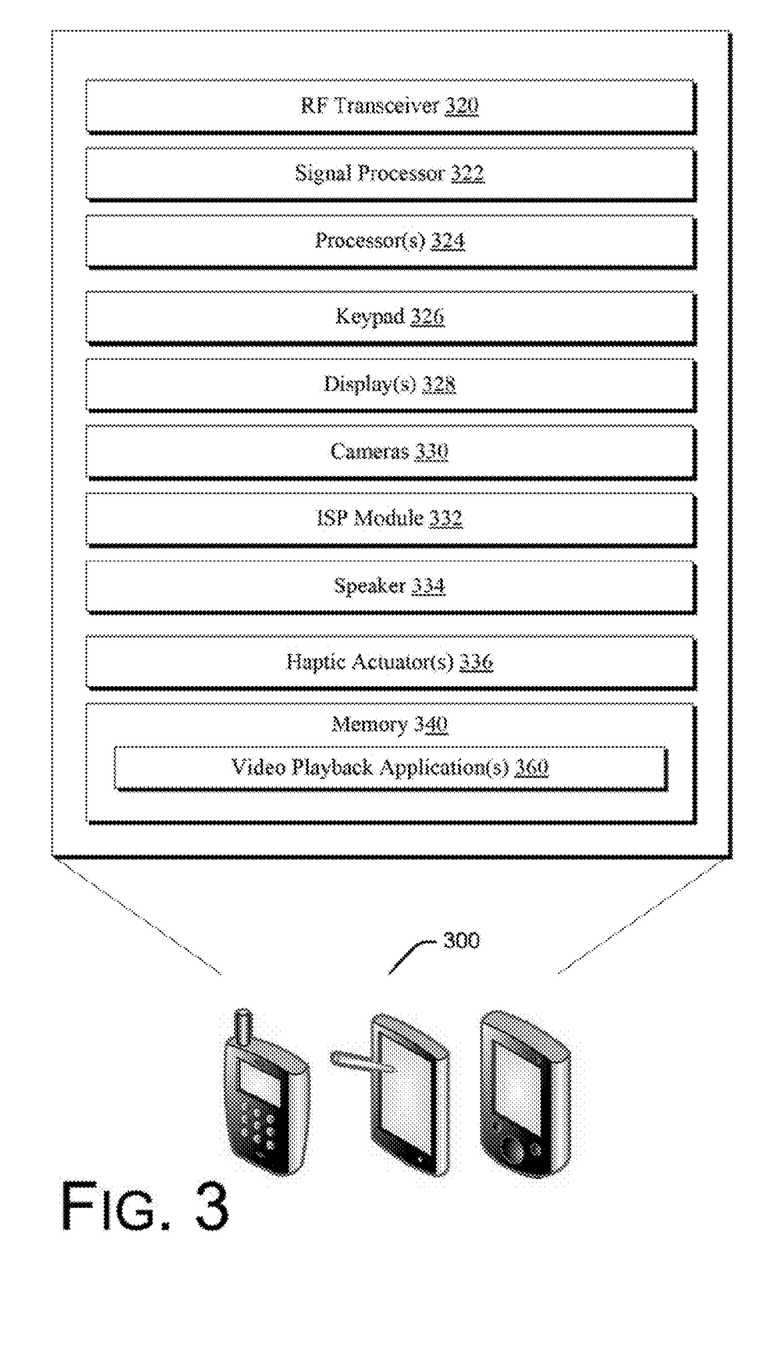

FIGS. 2-3 are schematic illustrations of exemplary electronic devices which may be adapted to implement haptic playback of video in accordance with some embodiments. Referring first to FIG. 2, in one embodiment, electronic device 100 one or more input/output devices which may include a display 202 having a screen 204, one or more speakers 206, a keyboard 210, one or more other I/O device(s) 212, and a mouse 214. The other I/O device(s) 212 may include a touch screen, a voice-activated input device, a track ball, and any other device that allows the device 200 to receive input from a user.

In various embodiments, the electronic device 200 may be embodied as a personal computer, a laptop computer, a personal digital assistant, a mobile telephone, an entertainment device, or another computing device. The electronic device 200 includes system hardware 220 and memory 230, which may be implemented as random access memory and/or read-only memory, A file store 280 may be communicatively coupled to computing device 208. File store 280 may be internal to computing device 208 such as, e.g., one or more hard drives, CD-ROM drives, DVD-ROM drives, or other types of storage devices. File store 280 may also be external to device 200 such as, e.g., one or more external hard, drives, network attached storage, or a separate storage network.

System hardware 220 may include one or more processors 222, at least two graphics processors 224, network interfaces 226, bus structures 228, and one or more haptics actuators 229. In one embodiment, processor 222 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 224 may function as adjunct processor that manages graphics and/or video operations. Graphics processor(s) 224 may be integrated onto the motherboard of electronic device 200 or may be coupled via an expansion slot on the motherboard.

In one embodiment, network interface 226 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 228 connect various components of system hardware 228. In one embodiment, bus structures 228 may be one or more of several types of bus structure(s) including a memory bus, a peripheral bus or external bus, and/or a local bus using any variety of available bus architectures including, but not limited to, 11-bit bus. Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Haptics actuators 229 may include one or more of a vibrating motor, a piezoelectric actuator, an electroactive polymer actuator or any similar device which generates a haptic feedback.

Memory 230 may include an operating system 240 for managing operations of electronic device 200. In one embodiment, operating system 240 includes a hardware interface module 254 that provides an interface to system hardware 220. In addition, operating system 240 may include a file system 250 that manages files used in the operation of electronic device 208 and a process control subsystem 252 that manages processes executing on electronic device 200.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 230. Operating system 240 may be embodied as a UNIX operating system or any derivative thereof (e.g., Linux, Solaris, etc.) or as a Windows® brand operating system, or other operating systems.

In one embodiment, memory 230 includes one or more video playback applications 260 which execute on the processor(s) 222 under the control of operating system 240. In some embodiments, the video playback application(s) 260 may utilize the graphics processor(s) 224 to display graphics on the display 204 and the haptics actuator(s) to generate haptic feedback to a user of the electronic device 200.

Referring to FIG. 3, in some embodiments electronic device 300 may be embodied as a mobile telephone, a personal digital assistant (PDA), or the like. Electronic device 300 may include an RF transceiver 320 to transceive RF signals and a signal processing module 322 to process signals received by RF transceiver 320.

RF transceiver 320 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 300 may further include one or more processors 324 and a memory module 340. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 324 may be one or more processors in the family of Intel® PXA27x processors available from Intel® Corporation of Santa Clara, Calif. Alternatively, other CPUs may be used, such as Intel's Itanium®□, XEON ATOM™, and Celeron® processors. Also, one or more processors from other manufactures may be utilized. Moreover, the processors may have a single or multi core design. In some embodiments, memory module 340 includes random access memory (RAM); however, memory module 340 may be implemented using other memory types such as dynamic RAM (DRAM), synchronous DRAM (SDRAM), and the like.

Electronic device 300 may further include one or more input/output interfaces such as, e.g., a keypad 326 and one or more displays 328. In some embodiments electronic device 300 comprises one or more camera modules 330 and an image signal processor 332, speakers 334, and one or more haptic actuators, as described with reference to FIG. 1.

In some embodiments electronic device 300 may include a computer readable memory 340 in which one or more video playback applications 360 reside. As described with reference to FIG. 1, the one or more video playback applications 360 may utilize the processor(s) 324 and the haptics actuator(s) 336 to generate haptic feedback to a user of the electronic device 300.

Figure 4A:
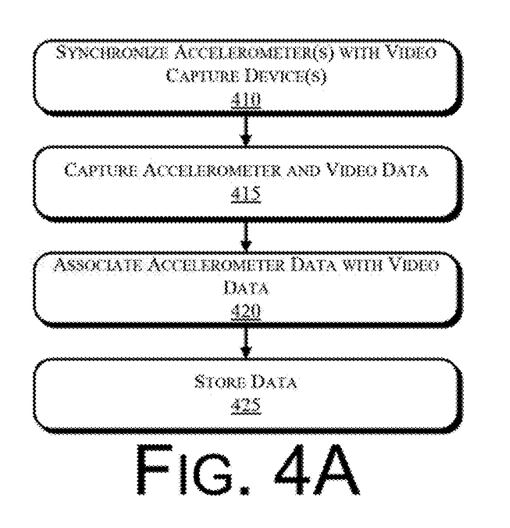
FIGS. 4A and 4B are flowcharts illustrating operations in part of a method to implement haptic playback of video in accordance with, according to embodiments.

Operations to implement haptic playback of video are described with reference to FIG. 4. Referring first to FIG. 4A, at operation 410 the one or more accelerometer(s) 110 are synchronized with the one or more video capture device(s) 120. In embodiments in which the accelerometer(s) 110 and the video capture device(s) 120 are separate devices the synchronization, operation, may be performed via a communication link such as a wired or wireless communication link between the devices. In embodiments in which the accelerometer(s) and the video capture device(s) are in the same device the synchronization may be performed via a suitable communication bus. In further embodiments the devices need not be synchronized before the accelerometer data and the video data are capture. Rather, the data streams may be synchronized as they are store, e.g., by providing a common time stamp to associate the data streams in a time dimension.

At operation 415 accelerometer data and video data are captured. In some embodiments the accelerometer(s) and the video capture device(s) may be activated during an event or activity, e.g., biking, skiing, hang gliding, parachuting, or the like. The accelerometer data may be processed to extract the relevant content for playback and converted into an appropriate waveform (which may be frequency based) for input to input into a haptic device. At operation 420 the accelerometer data is associated with the video data such that the accelerometer data is synchronized in time with the video data. At operation 425 the accelerometer data and the video data are stored in a suitable storage medium, e.g., in a computer readable memory.

Figure 4B:
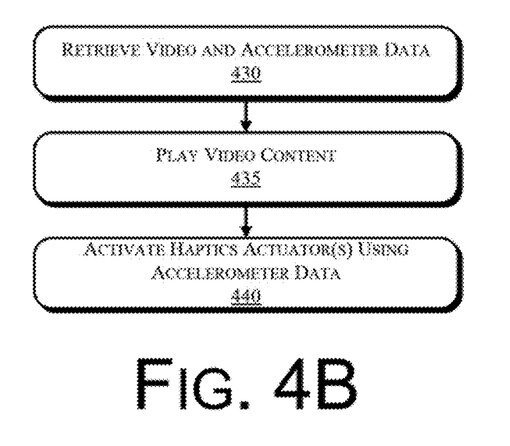

Referring now to FIG. 4B, when a video playback application 260, 360 is activated the application may retrieve (operation 430) the video and accelerometer data from the computer readable memory, and at operation 435 video content is played. In the embodiment depicted in FIG. 2 the video and accelerometer data may be retrieved from a computer readable memory such as file store 280 or from memory 230. Similarly, in the embodiment depicted in FIG. 3 the video and accelerometer data may be retrieved from a computer readable memory such as memory 240 or from a hard drive in or coupled to electronic device 300. As the video content is being played the video application activates (operation 440) one or more haptics actuators 229, 336 in response to the accelerometer data associated with the video content, thereby providing tactile feedback representative of the accelerometer data in association with the video content.

In some embodiments the electronic device on which the video is played back may comprise multiple different haptics actuators which provide different types of haptics feedback. In such embodiments the various haptics actuators may be registered and a profile of the haptics actuator may be stored in a memory module in association with the video content. By way of example, a driver or other suitable logic module may convert the accelerometer data to a format suitable for a haptics actuator. The electronic device may generate an input signal for the haptics actuator(s) to generate a haptics effect which corresponds to the accelerometer data. The signal may be input to the haptics actuator, which converts the signal to a haptics output.

Figure 5:
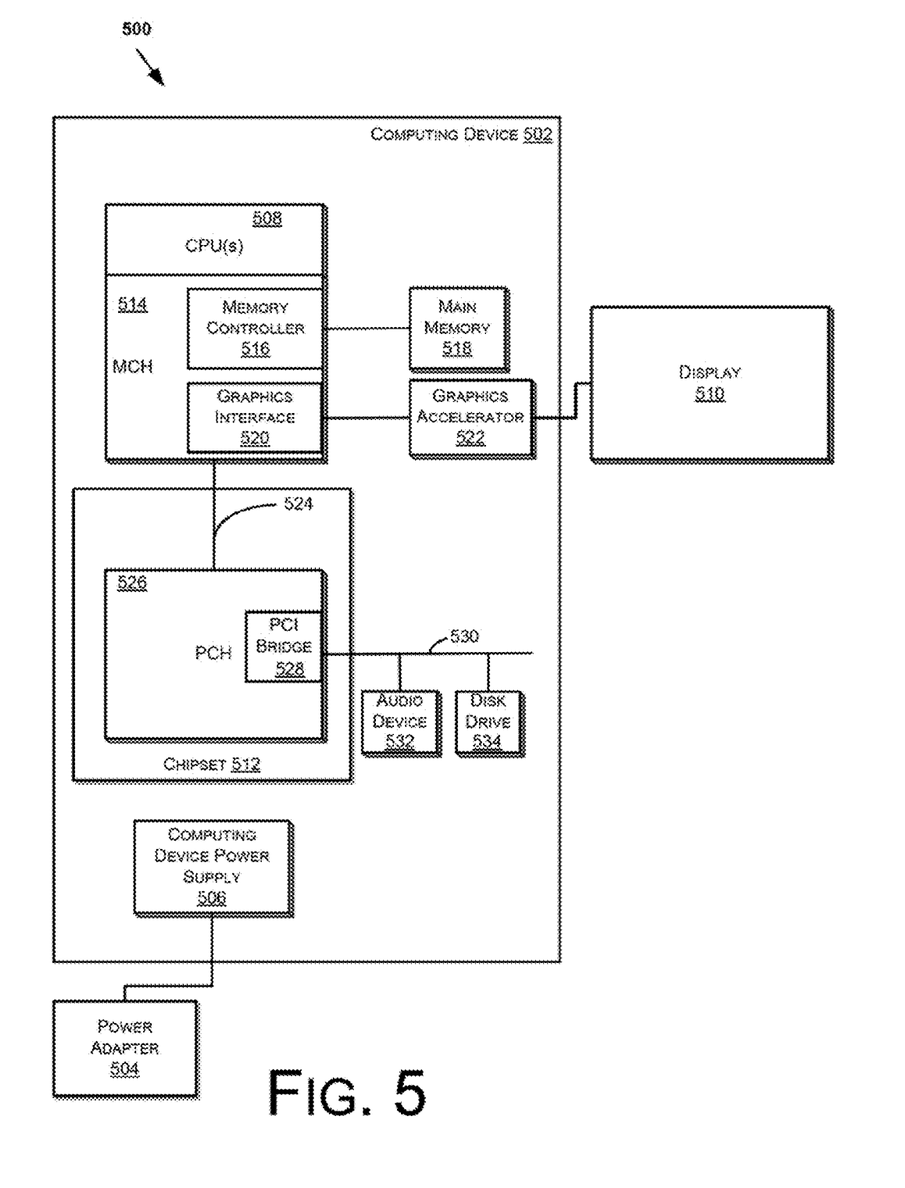
FIG. 5 is a schematic illustration of an electronic device which may be adapted to implement haptic playback of video, according to embodiments.

As described above, in some embodiments the electronic device may be embodied as a computer system. FIG. 5 is a schematic illustration of a computer system 500 in accordance with some embodiments. The computer system 500 includes a computing device 502 and a power adapter 504 (e.g., to supply electrical power to the computing device 502). The computing device 502 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 502 (e.g., through a computing device power supply 506) from one or more of the following sources: one or more battery packs, an alternating current (AC) outlet (e.g., through a transformer and/or adaptor such as a power adapter 504), automotive power supplies, airplane power supplies, and the like. In some embodiments, the power adapter 504 may transform the power supply source output (e.g., the AC outlet voltage of about 110 VAC to 240 VAC) to a direct current (DC) voltage ranging between about 5 VDC to 12.6 VDC. Accordingly, the power adapter 504 may be an AC/DC adapter.

The computing device 502 may also include one or more central processing unit(s) (CPUs) 508. In some embodiments, the CPU 508 may be one or more processors in the Pentium® family of processors including the Pentium® II processor family, Pentium® III processors, Pentium® IV , or CORE2 Duo processors available from Intel(r) Corporation of Santa Clara, Calif. Alternatively, other CPUs may be used, such as Intel's Itanium®, XEON☐, and Celeron® processors. Also, one or more processors from other manufactures may be utilized. Moreover, the processors may have a single or multi core design.

A chipset 512 may be coupled to, or integrated with, CPU 508. The chipset 512 may include a memory control hub (MCH) 514. The MCH 514 may include a memory controller 516 that is coupled to a main system memory 518. The main system memory 518 stores data and sequences of instructions that are executed by the CPU 508, or any other device included in the system 500. In some embodiments, the main system memory 518 includes random access memory (RAM); however, the main system memory 518 may be implemented using other memory types such as dynamic RAM (DRAM), synchronous DRAM (SDRAM), and the like. Additional devices may also be coupled to the bus 510, such as multiple CPUs and/or multiple system memories.

The MCH 514 may also include a graphics interface 520 coupled to a graphics accelerator 522. In some embodiments, the graphics interface 520 is coupled to the graphics accelerator 522 via an accelerated graphics port (AGP). In some embodiments, a display (such as a flat panel display) 540 may be coupled to the graphics interface 520 through, for example, a signal converter that translates a digital representation of an image stored in a storage device such, as video memory or system memory into display signals that are interpreted and displayed by the display. The display 540 signals produced by the display device may pass through various control devices before being interpreted by and subsequently displayed on the display.

A hub interlace 524 couples the MCH 514 to an platform control hub (PCH) 526. The PCH 526 provides an interface to input/output (I/O) devices coupled to the computer system 500. The PCH 526 may be coupled to a peripheral component interconnect (PCI) bus. Hence, the PCH 526 includes a PCI bridge 528 that provides an interface to a PCI bus 530. The PCI bridge 528 provides a data path between the CPU 508 and peripheral devices. Additionally, other types of I/O interconnect topologies may be utilized such as the PCI Express architecture, available through Intel® Corporation of Santa Clara, Calif.

The PCI bus 530 may be coupled to an audio device 532 and one or more disk drive(s) 534. Other devices may be coupled to the PCI bus 530. In addition, the CPU 508 and the MCH 514 may be combined to form a single chip. Furthermore, the graphics accelerator 522 may be included within the MCH 514 in other embodiments.

Additionally, other peripherals coupled to the PCH 526 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 502 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used, in particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
    logic to:
        capture accelerometer data and video content during a time period;
        associate the accelerometer data with the video content in a time dimension; and
        store the accelerometer data and the video content in a storage medium;
        play the video content on a display device coupled to the apparatus;
        retrieve the accelerometer data from the storage medium; and
        activate at least one haptics actuator coupled to the apparatus using the accelerometer data associated with the video content to provide tactile feedback representative of the accelerometer data in association with the video content.

2. The apparatus of claim 1, comprising logic to:
    store a profile of the one or more haptics actuators in association with the video content.

3. The apparatus of claim 2, comprising logic to:
    define an input signal for the one or more haptics actuators to generate a haptic effect corresponding to the accelerometer data.

4. The apparatus of claim 3, wherein a haptics actuator is to receive the input signal and is to convert the input signal to a haptics output.

5. An electronic device, comprising:
    an accelerometer;
    a video capture device; and
    logic to:
        capture accelerometer data from the accelerometer and video content during a time period;
        associate the accelerometer data with the video content in a time dimension; and
        store the accelerometer data and the video content in a storage medium;
        play the video content on a display device coupled to the apparatus;
        retrieve the accelerometer data from the storage medium; and
        activate at least one haptics actuator coupled to the apparatus using the accelerometer data associated with the video content to provide tactile feedback representative of the accelerometer data in association with the video content.

6. The electronic device of claim 5, comprising logic to:
    store a profile of the one or more haptics actuators in association with the video content.

7. The electronic device of claim 6, comprising logic to:
    define an input signal for the one or more haptics actuators to achieve one or more associated haptics effects.

8. The electronic device of claim 7, wherein the haptics actuator is to receive the input signal and is to convert the input signal to a haptics output.

9. A system, comprising:
    an accelerometer;
    a video capture device comprising logic to:
        capture accelerometer data from the accelerometer and video content during a time period;
        associate the accelerometer data with the video content in a time dimension; and
        store the accelerometer data and the video content in a storage medium; and
    a video playback device comprising logic to:
        play the video content on a display device coupled to the electronic device;
        retrieve the accelerometer data from the storage medium; and and
        activate at least one haptics actuator using the accelerometer data associated with the video content to provide tactile feedback representative of the accelerometer data in association with the video content.

10. The system of claim 9, wherein the accelerometer is an electronic device separate from the video capture device.

11. The system of claim 9, wherein the accelerometer is integrated with at least one of the video capture device or the video playback device.

12. The system of claim 9, wherein the accelerometer, the video capture device, and the video playback device are integrated into a single electronic device.

13. The system of claim 9, wherein the video playback device comprises logic to:
store the one or more haptics actuators in association with one or more haptics effects.

14. The system of claim 13, wherein the video playback device comprises logic to:
define an input signal for the one or more haptics actuators to achieve one or more associated haptics effects.

15. The system of claim 14, wherein the haptics actuator is to receive the input signal and is to convert the input signal to a haptics output.

16. A computer program product comprising logic instructions stored on a non-transitory computer readable medium which, when executed by a processor, configure the processor to perform operations, comprising:
capturing accelerometer data and video content during an event;
associating the accelerometer data with the video content in a time dimension; and
storing the accelerometer data and the video content in a storage medium
playing the video content on a display device coupled to the apparatus;
retrieving the accelerometer data from the storage medium; and
activating at least one haptics actuator coupled to the apparatus using the accelerometer data associated with the video content to provide tactile feedback representative of the accelerometer data in association with the video content.

17. The computer program product of claim 16, further comprising logic instructions stored on a non-transitory compter readable medium which, when executed by a processor, configure the processor to perform operations, comprising:
storing the one or more haptics actuators in association with the haptics effects.

18. The computer program product of claim 17, further comprising logic instructions stored on a non-transitory computer readable medium which, when executed by a processor, configure the processor to perform operations, comprising:
defining an input signal for the one or more haptics actuators to generate a haptic effect corresponding to the accelerometer data.

19. The computer program product of claim 18, wherein the one or more haptics actuators is to receive the input signal and is to convert the input signal to a haptics output.

* * * * *

UNITED STATES PATENT AND TRADEMARK OFFICE
CERTIFICATE OF CORRECTION

| | | |
|---|---|---|
| PATENT NO. | : 8,842,969 B2 | Page 1 of 1 |
| APPLICATION NO. | : 13/630130 | |
| DATED | : September 23, 2014 | |
| INVENTOR(S) | : Jered Wikander | |

It is certified that error appears in the above-identified patent and that said Letters Patent is hereby corrected as shown below:

In the Claims,

In column 8, line 58, In Claim 9, delete "and and" and insert -- and --, therefor.

In column 10, line 10, In Claim 17, delete "compter" and insert -- computer --, therefor.

Signed and Sealed this
Twenty-seventh Day of January, 2015

Michelle K. Lee
*Deputy Director of the United States Patent and Trademark Office*